United States Patent
Clements et al.

(10) Patent No.: US 9,702,270 B2
(45) Date of Patent: Jul. 11, 2017

(54) HYBRID RANKINE CYCLE

(71) Applicant: HER MAJESTY THE QUEEN IN RIGHT OF CANADA AS REPRESENTED BY THE MINISTER OF NATURAL RESOURCES, Ottawa (CA)

(72) Inventors: Bruce R. Clements, Nepean (CA); Lijun Wu, Kanata (CA); Richard Pomalis, Ottawa (CA); Ligang Zheng, Ottawa (CA)

(73) Assignee: HER MAJESTY THE QUEEN IN RIGHT OF CANADA AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 119 days.

(21) Appl. No.: 14/429,718

(22) PCT Filed: May 27, 2014

(86) PCT No.: PCT/CA2014/000459
§ 371 (c)(1),
(2) Date: Mar. 19, 2015

(87) PCT Pub. No.: WO2014/194400
PCT Pub. Date: Dec. 11, 2014

(65) Prior Publication Data
US 2015/0267567 A1    Sep. 24, 2015

Related U.S. Application Data

(60) Provisional application No. 61/832,643, filed on Jun. 7, 2013.

(51) Int. Cl.
*F01K 23/04* (2006.01)
*F01K 25/10* (2006.01)
(Continued)

(52) U.S. Cl.
CPC .............. *F01K 23/04* (2013.01); *F01K 7/22* (2013.01); *F01K 7/34* (2013.01); *F01K 7/38* (2013.01);
(Continued)

(58) Field of Classification Search
CPC .... F01K 23/04; F01K 7/34–7/44; F01K 7/38; F01K 17/00–17/06; F01K 25/08–25/106; F01K 23/02; F01K 23/06–23/108
(Continued)

(56) References Cited

U.S. PATENT DOCUMENTS 1,781,368 A * 11/1930 Davidson .................. F01K 7/40
60/676
2,959,013 A * 11/1960 Ricard ...................... F01K 7/42
60/678
(Continued)

FOREIGN PATENT DOCUMENTS

JP   WO 2013051265 A1 *  4/2013  ............. F01K 23/04
WO   2009010023 A2       1/2009
WO   2009045117 A2       4/2009

OTHER PUBLICATIONS

International Search Report dated Aug. 20, 2014, for corresponding International Patent Application No. PCT/CA2014/000459.
(Continued)

*Primary Examiner* — Mark Laurenzi
*Assistant Examiner* — Xiaoting Hu
(74) *Attorney, Agent, or Firm* — Pergament & Cepeda LLP; Milagros A. Cepeda; Edward D. Pergament (57) ABSTRACT

A system using hybrid Rankine cycles is provided. The system includes a first Rankine cycle system using a first working fluid, the first system producing exergy loss and residual energy from at least one of turbine extraction, turbine condensation and boiler flue gas; and a second
(Continued)

Rankine cycle system using a second working fluid to recover the exergy loss and residual energy. The second working fluid comprises a first stream and a second stream, wherein the first stream exchanges heat with the first system via at least one first heat exchanger, and the second stream exchanges heat with the first system via the at least one first heat exchanger and at least one second heat exchanger. A turbine of the first system is configured to allow the first working fluid to exit at a sufficiently high pressure and temperature to provide heat to the second system instead of expanding to a low pressure and temperature and discharging heat to ambient using a condenser.

7 Claims, 6 Drawing Sheets (51) Int. Cl.
    F01K 7/40 (2006.01)
    F01K 7/42 (2006.01)
    F01K 7/44 (2006.01)
    F01K 7/38 (2006.01)
    F01K 7/34 (2006.01)
    F01K 7/22 (2006.01)
    F01K 25/08 (2006.01)
    F22B 1/18 (2006.01)

(52) U.S. Cl.
    CPC .............. F01K 7/40 (2013.01); F01K 7/42 (2013.01); F01K 7/44 (2013.01); F01K 25/08 (2013.01); F01K 25/10 (2013.01); F01K 25/103 (2013.01); F01K 25/106 (2013.01); F22B 1/1838 (2013.01); Y02E 20/344 (2013.01)

(58) Field of Classification Search
    USPC .................... 60/653, 654, 677–680, 655
    See application file for complete search history.

(56) References Cited

U.S. PATENT DOCUMENTS

| | | | | |
|---|---|---|---|---|
| 2,991,620 A * | 7/1961 | Nekolny | .............. | F01K 7/40 60/667 |
| 3,016,711 A * | 1/1962 | Shakeshaft | .............. | F01K 7/40 60/657 |
| 3,032,999 A * | 5/1962 | Pacault | .............. | F01K 17/06 122/1 C |
| 3,048,017 A * | 8/1962 | Mary | .............. | F01K 7/40 60/678 |
| 3,164,958 A * | 1/1965 | Pacault | .............. | F01K 7/44 60/39.182 |
| 3,289,408 A * | 12/1966 | Silvestri, Jr. | .............. | F01K 7/40 415/169.2 |
| 3,307,350 A * | 3/1967 | Squires | .............. | F01K 21/047 60/39.181 |
| 3,374,621 A * | 3/1968 | Cosar | .............. | F01K 7/44 122/1 R |
| 3,436,911 A * | 4/1969 | Squires | .............. | F01K 7/42 60/39.181 |
| 3,436,912 A * | 4/1969 | Squires | .............. | F01K 23/04 60/39.181 |
| 4,043,130 A * | 8/1977 | Brown | .............. | F01K 7/223 60/652 |
| 5,754,613 A * | 5/1998 | Hashiguchi | .............. | F01K 25/065 376/378 |
| 7,096,665 B2 * | 8/2006 | Stinger | .............. | F01K 25/08 60/651 |
| 7,287,381 B1 | 10/2007 | Pierson et al. | | |
| 7,891,189 B2 | 2/2011 | Bottger et al. | | |
| 7,942,001 B2 | 5/2011 | Radcliff et al. | | |
| 8,650,879 B2 | 2/2014 | Freund et al. | | |
| 9,097,143 B2 | 8/2015 | Smith et al. | | |
| 2007/0095066 A1* | 5/2007 | Kaplan | .............. | F01K 23/02 60/670 |
| 2008/0168772 A1* | 7/2008 | Radcliff | .............. | F01K 25/08 60/651 |
| 2011/0113780 A1 | 5/2011 | Lehar | | |
| 2011/0308253 A1* | 12/2011 | Ritter | .............. | F01K 23/04 60/661 |
| 2012/0301834 A1* | 11/2012 | Clements | .............. | F23J 15/06 431/2 |
| 2014/0290244 A1* | 10/2014 | Yamashita | .............. | F01K 23/04 60/641.5 |

OTHER PUBLICATIONS

Written Opinion dated Aug. 20, 2014, for corresponding International Patent Application No. PCT/CA2014/000459.

International Preliminary Report on Patentability issued Dec. 8, 2015, for corresponding International Patent Application No. PCT/CA2014/000459.

* cited by examiner

HYBRID RANKINE CYCLE

This application is a National Stage Application under 35 U.S.C. §371 of PCT International Application No. PCT/CA2014/000459, filed May 27, 2014, which claims the benefit of U.S. Provisional Application No. 61/832,643, filed Jun. 7, 2013, all of which are hereby incorporated by reference in their entireties.

TECHNICAL FIELD OF THE INVENTION

The present invention relates generally to energy recovery and particularly to systems and methods for thermal energy conversion.

BACKGROUND OF THE INVENTION

Thermal power conversion using fossil fuel is a technology used by major power utilities to generate electricity. Thermal power cycles typically convert chemical energy of fossil fuels into thermal energy of flue gas through combustion. The thermal energy from flue gas is transferred to pressurized water-steam which drives turbines through steam expansion, releasing the remaining thermal energy of the exhaust steam to the ambient environment through condensation, with repressurization of the condensed water for the next cycle. Such energy conversion cycle with water-steam as a working fluid in turbines is known as steam Rankine cycle (SRC). Although water-steam is the predominant working fluid for conventional power cycles, it is possible to use other working fluids as well. Other common working fluids are organic fluids. The energy conversion cycles that employ organic working fluids in turbines are known as organic Rankine cycles (ORCs).

Unfortunately, fossil fuels are also the main source of pollutants; greenhouse gases as well as criteria air contaminants The low efficiencies of conventional steam Rankine cycle systems exacerbate the problem with these emissions. Increasing cycle efficiency is widely viewed as the most effective means to reduce all these emissions.

In general, energy losses are inevitable in the course of any Rankine cycle's operation. Over the past century, there has been a steady increase in steam Rankine cycle efficiency. Approaches to improve SRC efficiency have included: (1) reheat, (2) regeneration, (3) increase of the maximum steam working fluid operating temperature and pressure, (4) decrease of heat sink temperatures by increasing condenser vacuum, (5) recovery of energy losses, and (6) increase of the equipment efficiencies.

These improvements have resulted in the so-called reheat regenerative steam Rankine cycle (RRSRC) and cycle efficiency improvement from 20% to about 40%. This means that even with the best steam Rankine cycles available today, there are still losses of 60%, and as a result, SRC efficiencies remain low.

Figure 1:
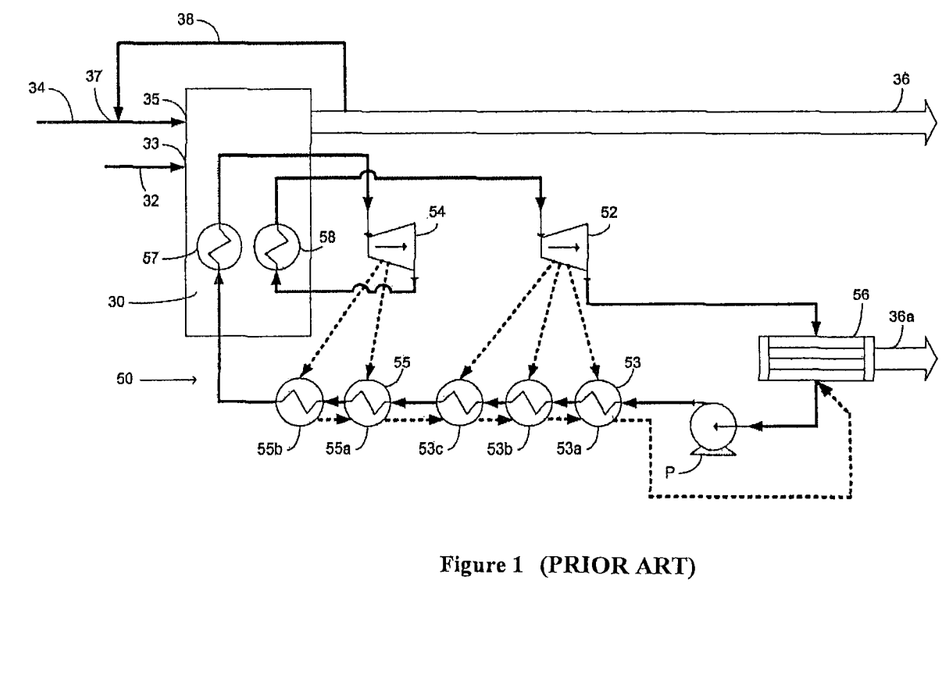
FIG. 1 shows a flow diagram of a reheat regenerative steam Rankine cycle of prior art.

For example, with conventional reheat and regeneration approaches, as represented by a typical reheat regenerative steam Rankine cycle (RRSRC) system shown in FIG. 1 and a corresponding temperature-entropy (T-S) diagram as shown in FIG. 1A, process 6-7 represent reheat (reheater 58 in FIG. 1), processes 1c-1b-1a, 2c-2b-2a, 3c-3b-3a, 4c-4b-4a, and 5c-5b-5a represent regeneration (feedwater heaters 55b, 55a, 53c, 53b, 53a in FIG. 1).

In regeneration, steam extraction at point 1c releases heat through process 1c-1b-1a to feedwater at point 2a and the feedwater temperature rises up to point 1a; steam extraction at point 2c releases heat through process 2c-2b-2a to feedwater at point 3a and the feedwater temperature rises up to point 2a, and so on. It can be seen that extraction points 1c, 2c, 3c, 4c and 5c are in the superheated region: the higher the temperature of the point 5 and 7, the higher the extraction temperature of points 1c, 2c, 3c, 4c and 5c will be giving a higher temperature difference between the extraction steam and feedwater, which results in greater irreversibility or exergy loss of the regeneration process.

With the conventional approach of decreasing the heat sink temperatures, in FIG. 1A, process 8-1 represents condensation of exhausted steam (condenser 56 in FIG. 1) and exhausted heat 36a in FIG. 1 is discharged to ambient (heat sink) through the cooling water. As steam begins to condense at 100° C. at atmosphere pressure, in order to make the condensation of steam happen at a temperature much lower than 100° C., the condenser must operate at considerably lower pressures. Even if a heat sink source with very low temperature exists such as cooling water in winter or deep lake water (with a temperature of near 4° C. year round below approximately 20 m), the condensing temperature will not be sufficiently low to take full advantage of the cooling water. This is because the volumetric flow rate of steam, under such vacuum conditions, is so high that it results in huge dynamic losses in the turbine and actually lowers the turbine efficiency; meanwhile, the steam becomes very wet in the course of its expansion prior to reaching the condenser. Water droplets in the wet steam will cause serious erosion of turbine blades and will result in safety issues. Of the 60% heat losses in SRC, the majority are due to exhausted heat discharged to the heat sink by steam-water condensation, which is unrecoverable energy loss.

One method of identifying whether losses are recoverable is to compare the real SRC efficiencies with their Carnot cycle efficiencies. For instance, a system with a turbine entry temperature of 565° C. and condenser temperature of 10° C. gives a theoretical Carnot efficiency of about 66%, but the actual cycle efficiency is about 40%, which means that an increase in efficiency of about 26% may still be attainable overall in theory, but not feasible with water-steam as the working fluid.

With respect to the conventional approach of recovery of energy losses, there exist low temperature heat losses 36 in FIG. 1 from the boiler exhaust flue gas. The magnitudes of these losses are sufficiently large that they should not be neglected and opportunities for heat recovery must be sought. Again, these losses are less suitable for recovery with water-steam as the working fluid.

Rankine cycles using working fluids other than water/steam are known.

For example, International patent application WO2009/098471 generally discloses a method and apparatus for generating power wherein water is heated to generate wet steam in a positive displacement steam expander. The expanded steam is condensed and returned to the boiler. The expanded steam may be condensed in the boiler of an Organic Rankine Cycle to provide additional power.

United States Patent Application 20110113780 discloses a waste heat recovery system using a Brayton cycle system as a top cycle circulating carbon dioxide vapour, and a Rankine cycle system as a bottom cycle configured to circulate a working fluid in heat exchange relationship with the carbon dioxide vapor, wherein the working fluid from a heat exchanger is divided into two portions, with one portion being fed to another heat exchanger and subsequently mixed with the other portion of the working fluid.

International patent application WO2009/045117 discloses a power plant having two working cycles thermally coupled with one another by at least one heat exchanger, whereas the working fluid in the lower cycle is a substance with a low evaporation enthalpy and a relatively high preheating enthalpy, preferably an organic fluid, while a high-temperature source of heat is used to preheat, evaporate and superheat the working fluid in the upper cycle.

The above prior art systems and other systems such as those disclosed in U.S. Pat. Nos. 7,287,381, 7,096,665, 7,942,001 and 7,891,189 generally follow the above conventional configurations and/or approaches to SRC efficiency improvement, and inherit the disadvantages associated with those approaches.

Therefore, there remains the need to improve the efficiency of thermal power conversion based on Rankine cycles.

SUMMARY OF THE INVENTION

It is an objective of the present invention to provide an improved power conversion system using Rankine cycles.

The present invention overcomes the shortcomings of the prior art by providing a hybrid Rankine cycle (HyRC) that employs at least two different fluids, for example, water-steam and organic fluids, as working fluids, under both high pressure oxygen-fired combustion (HiPrOx) and ambient pressure combustion (APC) modes to increase thermal power cycle efficiency. There are also some other fluids that can be used in Rankine cycles such as $H_2$, $CO_2$, ammonia, etc.

The hybrid Rankine cycle may be applied to other high temperature working fluids combined with lower temperature cycles such as binary fluid cycles (e.g. Kalina cycle).

Unlike water-steam, organic fluids generally have lower critical temperatures and pressures, evaporate at relatively low temperatures, and remain in the dry vapour state in the course of expansion towards ambient temperatures.

Furthermore, many organic fluids can remain in the dry vapour state at even lower temperatures, and can take full advantage of a very low temperature cooling source. ORC turbines can have efficiencies around 90%, as compared to a typical 80% efficiency for SRC turbines at low pressure and temperature. Unlike an SRC, low temperature heat losses from the boiler exhaust flue gas can also be used as a heat source in ORCs.

Recognizing that in the course of SRC energy conversion, there exist steam streams at different temperatures and pressures coming from the turbine side and the waste heat streams originating from the boiler side, the present invention allows optimal coupling of streams which are more suitable source for the SRC and streams which are more suitable source for the ORC, thereby providing a hybrid Rankine cycle for maximization of energy conversion and overall efficiency.

On the boiler side, the combustion process can be carried out either at ambient pressure or at high pressure. In the high pressure mode, the produced flue gas under pressure has a higher quality at the exhaust point than it would at ambient pressure resulting in a higher potential for ORC heat recovery.

Therefore, the present invention provides an improved cycle configuration based on a HiPrOx and hybrid Rankine cycle (HiPrOx-HyRC) or an ambient pressure combustion and hybrid Rankine cycle (APC-HyRC). The HiPrOx-HyRC concept is expected to increase the cycle efficiency of subcritical and supercritical systems from about 34% to 39% and about 39% to 44%, respectively.

In accordance with one aspect of the present invention, there is provided a hybrid thermal energy conversion system comprising: a first reheat-regenerative Rankine cycle system comprising a turbine using a first working fluid, the first Rankine cycle system producing exergy loss and residual energy from at least one of turbine extraction, turbine condensation and boiler flue gas; and a second Rankine cycle system using a second working fluid to recover the exergy loss and residual energy of the first Rankine cycle system; wherein the second working fluid comprises at least a first stream and a second stream, and wherein the first stream exchanges heat with the first Rankine cycle system via at least one first heat exchanger, and the second stream exchanges heat with the first Rankine cycle system via at least one first heat exchanger and at least one second heat exchanger.

In accordance with another aspect of the present invention, there is provided a first Rankine cycle system using a first working fluid, the first Rankine cycle system producing exergy loss and residual energy from at least one of turbine extraction, turbine condensation and boiler flue gas; and a second Rankine cycle system using a second working fluid, the second Rankine cycle system being in thermal communication with the first Rankine cycle system through at least one heater exchanger; wherein the exergy loss and residual energy produced by the first Rankine cycle system is recovered by the second system without discharging any of the residual energy to ambient using a condenser.

Preferably, the portion of energy with exergy loss from the turbine extraction of the first Rankine cycle system superheats at least a first portion of the second working fluid, and the residual energy from the boiler flue gas of the first Rankine cycle system superheats at least a second portion of the second working fluid.

Preferably, at least one turbine of the first Rankine cycle system is configured to allow a portion of the first working fluid exiting from the turbine extraction to superheat at least a portion of the working fluid of the second Rankine cycle system.

Preferably, at least one turbine of the first Rankine cycle system is configured to allow the first working fluid to exit from the turbine exhaust at a sufficiently high pressure and temperature so as to provide a source of heat for the second Rankine cycle system without discharging heat to a low-temperature condenser.

Preferably, at least one turbine of the first Rankine cycle system is configured to allow the first working fluid exiting the turbine exhaust to condensate at a sufficiently high pressure and temperature after releasing heat to the second working fluid, thereby enables reduction in condenser size for the first working fluid.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein:

FIG. 1A shows a T-S diagram of FIG. 1;

DETAILED DESCRIPTION OF THE INVENTION

FIG. 1 shows a schematic conventional layout of a reheat regenerative steam Rankine cycle thermal energy conversion system 50 of the prior art. FIG. 1A shows a corresponding temperature-entropy (T-S) diagram of the prior art system of FIG. 1.

The Rankine cycle system of FIG. 1 typically comprises a boiler or furnace 30 which is fed by a fuel supply from line 32 at a fuel inlet 33, and may optionally be fed by an air or oxygen supply from line 34 at an air or oxygen inlet 35. Flue gas generated by the combustion leaves furnace 30 in flue gas line 36. Optionally, a recirculation stream can be separated from the flue gas stream in flue gas line 36, to be selectively recirculated back in flue gas recirculation line 38 to be reintroduced to the furnace in a suitable manner, either through a separate inlet (not shown) or by joining the air or oxygen supply in line 34.

In Rankine cycle 50 of FIG. 1, expanded working fluid leaves an intermediate pressure/low pressure turbine 52, passes through and is condensed in a condenser 56 producing exhausted heat 36a, and passes through a pump P to a first group of feedwater heaters 53, shown as feedwater heaters 53a, 53b and 53c. Extracted heat can be selectively provided to each of feedwater heaters 53a, 53b and 53c from the intermediate pressure/low pressure turbine 52. The working fluid then passes to a second group of feedwater heaters 55, shown here as feedwater heaters 55a and 55b. Extracted heat can be selectively provided to each of feedwater heaters 55a and 55b from a high pressure turbine 54. The working fluid then passes to steam generating heat exchangers 57, supplied with heat from furnace 30, and delivered to and expanded in a high pressure turbine 54 to provide energy to a process or system being powered by Rankine cycle 50. Thereafter, the working fluid is reheated in a reheater 58, which is also supplied with heat from furnace 30, before passing to and being expanded in the intermediate pressure/low pressure turbine 52 to provide energy to a process or system being powered by Rankine cycle 50, and to complete the cycle.

Figure 2:
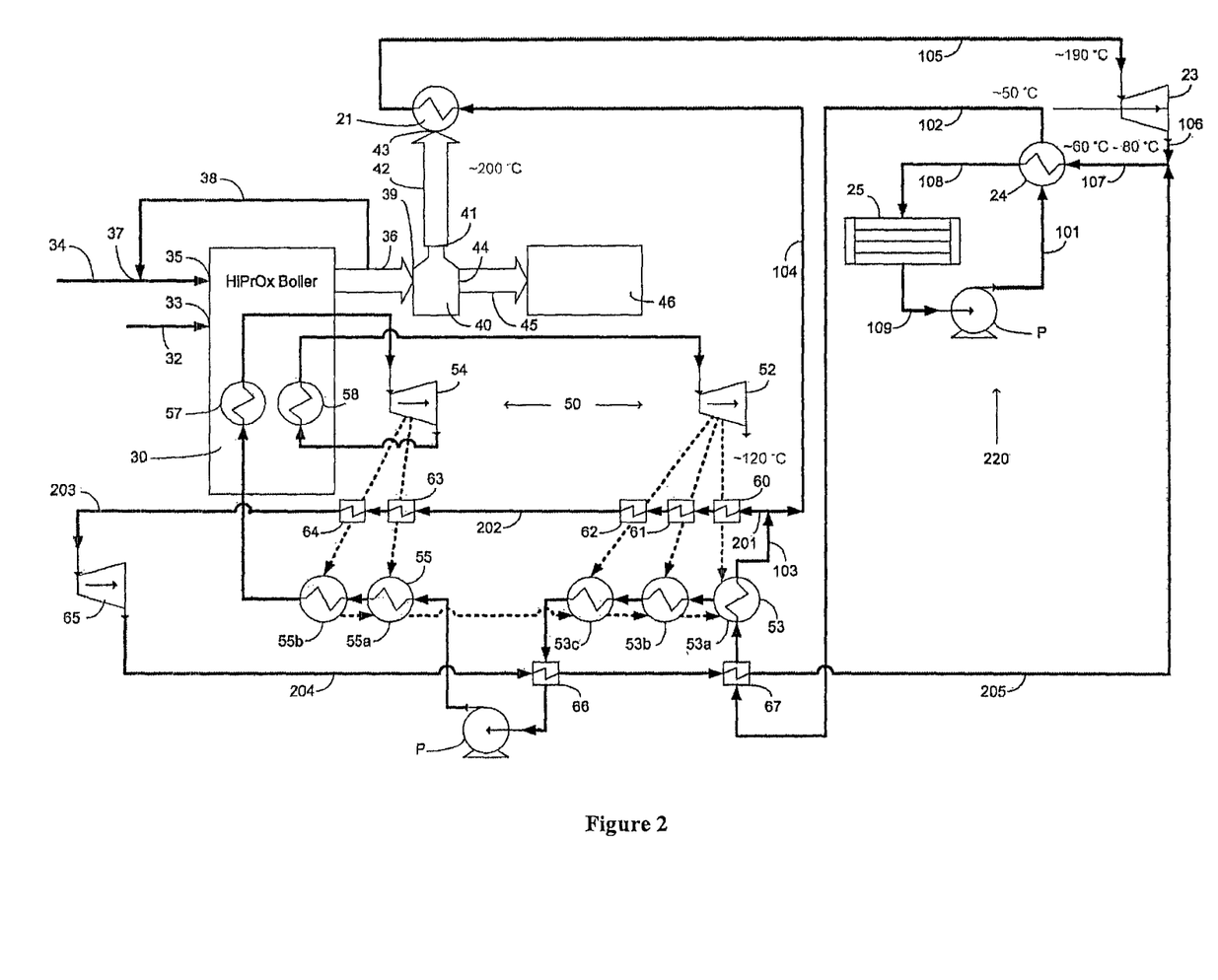
FIG. 2 shows a flow diagram of an embodiment of HiPrOx-HyRC.
Figure 2A:
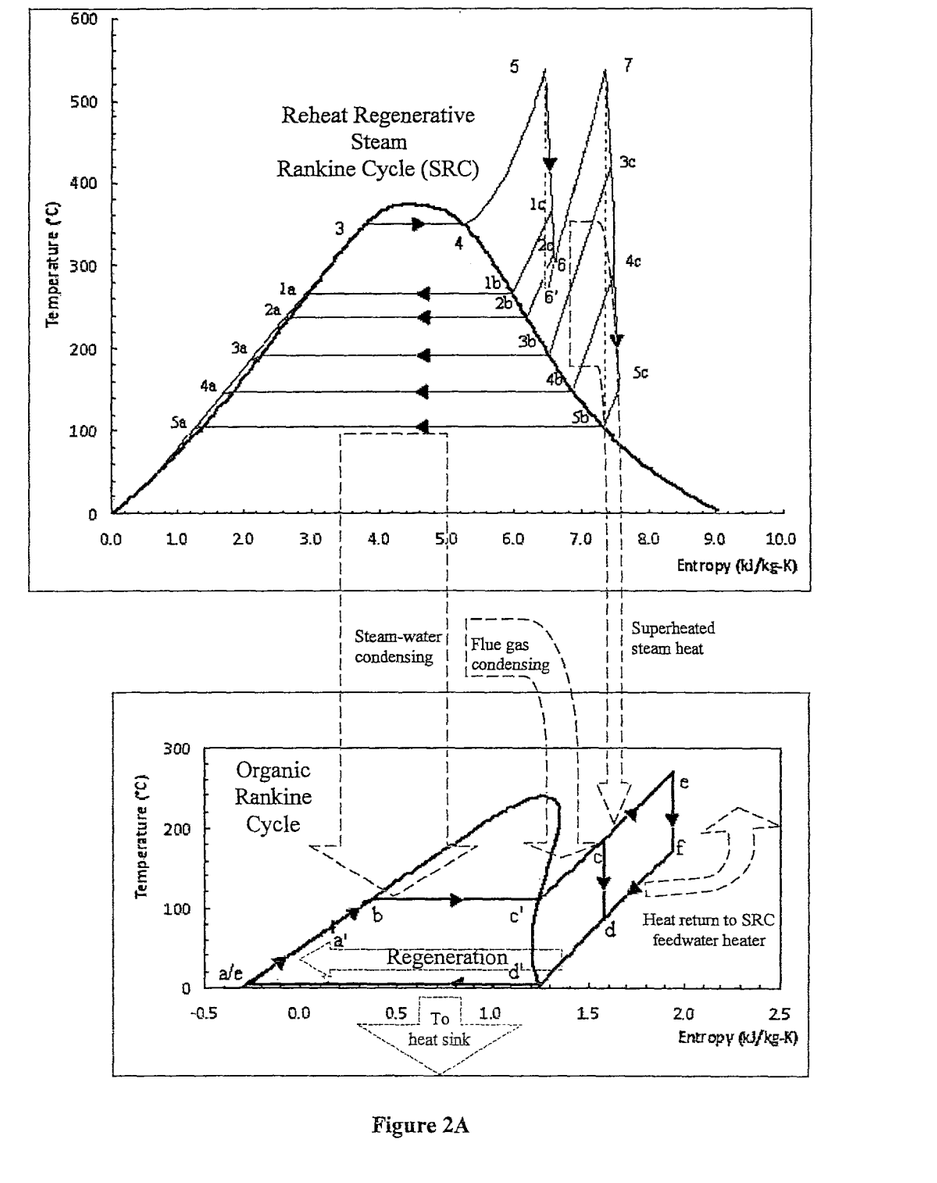
FIG. 2A shows a T-S diagram of FIG. 2.
Figure 3:
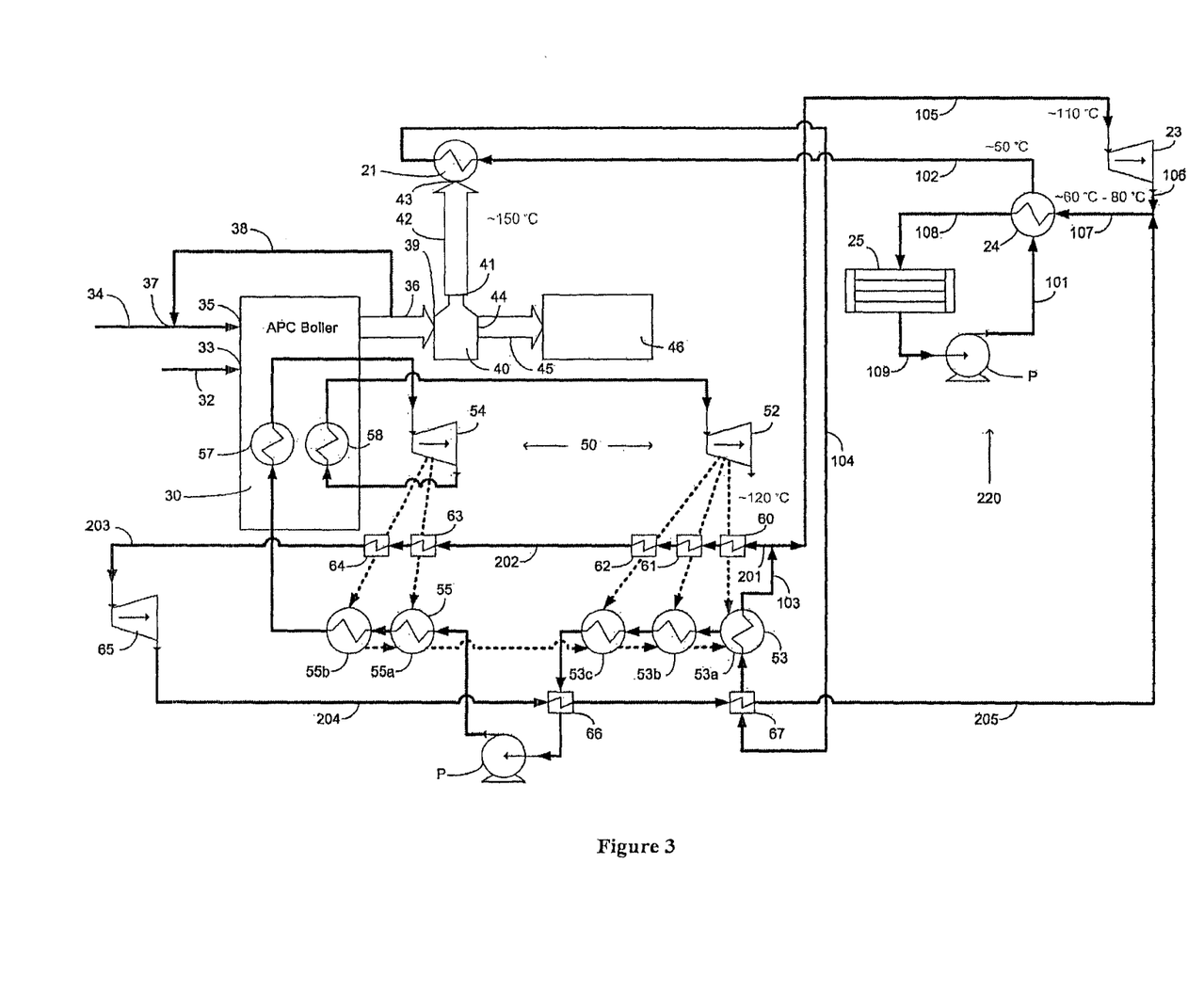
FIG. 3 shows a flow diagram of an embodiment of APC-HyRC.
Figure 3A:
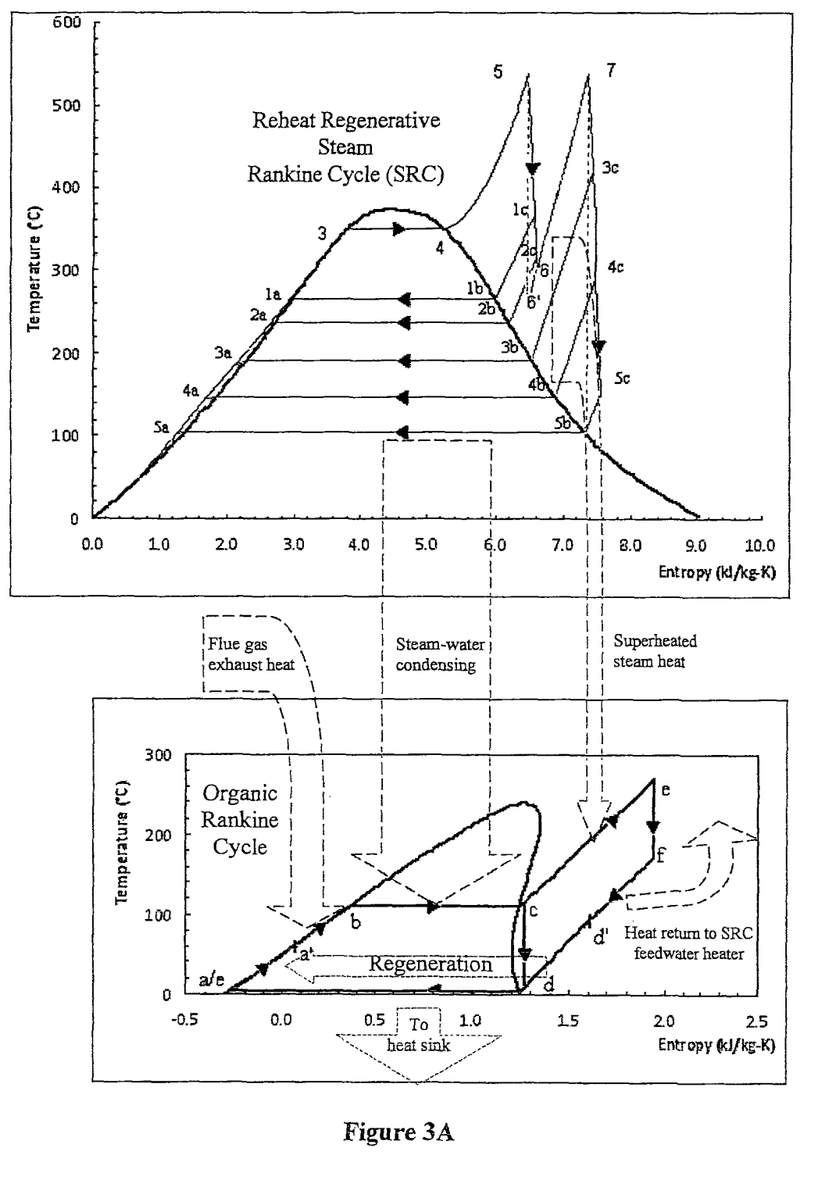
FIG. 3A shows a T-S diagram of FIG. 3.

Referring to FIGS. 2 to 3A, embodiments of the present invention will now be described with reference to the accompanying drawings, in which some, but not all embodiments of the invention are shown.

FIG. 2 illustrates an embodiment of the invention with a hybrid thermal energy conversion system in HiPrOx-HyRC configuration. The corresponding cycle T-S diagram is shown in FIG. 2A. In HiPrOx-HyRC mode, oxy-fuel is supplied at a pressurized condition, as opposed to at ambient pressure, to the boiler 30 for creating a heat source. One advantage of HiPrOx is that it increases the condensing temperature of moisture in flue gas with an elevated pressure. At 80 bar, the condensing temperature of moisture in flue gas can be in the range of 150° C.-200° C. compared to the low condensation temperature 50° C.-55° C. of moisture in flue gas at an ambient pressure. While steam and organic fluids are used in the embodiment of FIG. 2 for illustration purpose, other suitable liquids can be selected and used for a particular application.

The system of FIG. 2 comprises a first reheat-regenerative Rankine cycle system 50 using a first working fluid, the first Rankine cycle system producing exergy loss and residual energy from at least one of turbine extraction, turbine condensation and boiler flue gas; a second system 220 using a second working fluid 102, the second system being in thermal communication with the first Rankine cycle system 50 through at least one heater exchanger; wherein the exergy loss and residual energy produced by the first Rankine cycle system is recovered by the second system without discharging any of the residual energy from the first Rankine cycle system to ambient using a condenser.

In the exemplary embodiment of FIG. 2, the main flue gas stream is delivered to a condenser 40 at flue gas inlet 39. Condenser 40 can be of any known construction, and is preferably a condensing heat exchanger.

In condenser 40, water is condensed from the flue gas stream, the condensate passes through condensate line 42 to be delivered to high temperature superheater 21 at a condensate inlet 43, and the heat of condensation is provided to high temperature superheater 21, to contribute to the heating source of the working fluid in organic Rankine cycle 220. The remaining gaseous portion of the flue gas stream, mostly pressurized carbon dioxide, leaves condenser 40 at an outlet 44, and passes through line 45 to a carbon dioxide capture system 46, where impurities are removed by known means, and the carbon dioxide product stream is removed for further processing, use or sequestration.

Comparing with the prior art cycle as shown in FIG. 1, in the embodiment of FIG. 2, the location where the last steam stream exits from the SRC turbine 52 is moved back to a higher pressure point (to point 5c from point 8 as represented in FIG. 1A) for extracting superheated steam, and the condenser 56 in FIG. 1 is eliminated.

In other words, preferably, the last one of a plurality of staged turbines within which the first working fluid expands is configured to allow the first working fluid to exit therefrom as a slightly superheated steam for transferring heat thereof to the second working fluid.

Instead of discharging heat to condenser 56 in the prior art cycle as shown in FIG. 1, the steam exhausted from turbine 52 releases heat at heaters 53 to an organic fluid 102 through at least one of heat exchanger 53a, 53b and 53c (process 5c-5b-5c in FIG. 2A) and changes back to liquid water starting the next cycle. The organic fluid 102 is referred to as fluid 103 after this heat exchange. This condensation process 5c-5b-5c through heat exchange starting from point 5c in FIG. 2A can avoid the low pressure steam at point 5c to expand in a wet region where its expansion efficiency is sometimes as low as 68%, and turns the steam at point 5c in FIG. 2A into one of the heat sources for organic cycle in which the organic fluid can expand in a dry vapour state more efficiently (efficiencies as high as 91% are claimed by some ORC manufacturers).

In some embodiments, the second working fluid 102 comprises at least a first stream and a second stream, wherein the first stream exchanges heat with the first Rankine cycle system via at least one first heat exchanger, and the second stream exchanges heat with the first Rankine cycle system via the at least one second heat exchanger and at least one third heat exchanger.

Referring to FIG. 2, the organic fluid 102 receives the heat from steam heat exchanger 53a (process a'-b-c' in FIG. 2A), and splits into two streams 104 and 201: stream 104 passes through flue gas superheater 21 and is superheated as stream 105 (process c'-c in FIG. 2A) by the flue gas 36. Stream 105 then expands in turbine 23 (process c-d in FIG. 2A) to generate work or electricity and exits from turbine 23 as stream 106. Another stream 201 flows through at least one of a series of heat exchangers 60, 61, 62, 63 and 64 and is superheated as stream 202, 203 (process c'-c-e in FIG. 2A) by the portion of superheat in steam extraction bleeds and then expands in turbine 65 (process e-f in FIG. 2A). As the temperature of stream 204 leaving turbine 65 is still high, its heat can be released back to the SRC feedwater via a heat exchanger 66 to maintain feedwater temperature and further possibly released to regenerator 67 to heat organic fluid in an acceptable temperature range (process f-d in FIG. 2A). The two streams 205 and 106 are then combined into stream 107 and enter regenerator 24 where the remaining heat of stream 107 is released to the condensed organic fluid (process d-d' to a-a' in FIG. 2A). The final exhaust heat 108 is discharged in condenser 25 (process d'-e in FIG. 2A) to a low temperature heat sink. After changing back to the liquid phase, the organic fluid 109 is pressurized by pump P, the pressurized stream 101 is preheated in regenerator 24 (process a-a' in FIG. 2A), and then flows as stream 102 to at least one of heat exchangers 53a, 53b and 53c to start the next cycle.

The HiPrOx-based hybrid SRC and ORC (HiPrOx-HyRC) thus takes full advantage of the following phenomena: the water-steam working fluid has good thermodynamic properties for operation in higher temperature regions and organic fluids have more suitable properties for low temperature operation for overall cycle efficiency improvement. Other possible benefits provided by HiPrOx-HyRC include:

Reduction in condenser size,
Reduction in the erosion potential in the back of the low pressure stage as a result of operating under conditions leading to drier vapours,
Use of other waste heat sources that exist in close proximity to the plant,
Reduction in requirements for deaeration of feedwater, and
Generation of water from flue gas condensation.

It is to be noted that although initially applied to steam cycles combined with organic Rankine cycle systems, embodiments described herein can be applied in a similar fashion to any working fluids. Transferring heats from steam extraction bleeds, the low pressure turbines and flue gas to an ORC working fluid may increase the overall system net efficiency by as much as 5% (e.g. a power generation cycle efficiency of 34% increases to 39%).

Referring to FIGS. 3 and 3A, there is shown an alternative exemplary embodiment of ambient pressure combustion (APC) system with APC-HyRC configuration.

In FIG. 3, the flow path of the organic fluid in turbine side remains substantially the same as in FIG. 2. In APC mode, the temperature of the produced flue gas 36 is much lower than that in the HiPrOx mode and is not suitable for superheating organic fluid. Instead, the flue gas 36 is coupled with an ORC as a heat resource at heat exchanger 21 which pre-heats stream 102 (process a'-b in FIG. 3A). Pre-heated organic fluid stream 104 enters at least one of heat exchangers 53a, 53b and 53c, receives heat and becomes saturated vapour 105 (process b-c in FIG. 3A). Saturated vapour 105 then expands in turbine 23 (process c-d in FIG. 3A) to generate work or electricity.

The exemplary embodiments described herein can be applied to various power plants, including APC power plants, which are responsible for the majority of electricity generation worldwide. Even a small efficiency improvement in their operation will have huge impact on the reduction of green house gas emissions and the reduction of the cost of electricity generation.

The APC-HyRC configuration has the potential for retrofit and is also applicable to new systems. There are several ways of implementing the concept in an exact configuration and this will vary with the details of the existing Rankine cycle, as would be appreciated by a person skilled in the art.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

The invention claimed is:

1. A hybrid thermal energy conversion system comprising:
   a first reheat-regenerative Rankine cycle system comprising a turbine using a first working fluid, a reheater, and a plurality of feedwater heaters configured to be heated by a portion of the first working fluid exiting from turbine extraction, the first Rankine cycle system producing exergy loss and residual energy from at least one of the turbine extraction, turbine condensation and boiler flue gas; and
   a second Rankine cycle system using a second working fluid to recover the exergy loss and residual energy of the first Rankine cycle system;
   wherein the second working fluid comprises at least a first stream and a second stream, and wherein the first stream exchanges heat with the first Rankine cycle system via at least one first heat exchanger, and the second stream exchanges heat with the first Rankine cycle system via at least one second heat exchanger and at least one third heat exchanger; and
   wherein the at least one second heat exchanger and the at least one third heat exchanger are disposed in turbine extraction lines between the turbine and the plurality of feedwater heaters, such that the portion of the first working fluid exiting from the turbine extraction superheats the second stream of the second working fluid.

2. The system of claim 1, wherein the turbine is a last of a plurality of staged turbines within which the first working fluid expands, and is configured to allow the first working fluid to exit therefrom as a superheated steam for transferring heat thereof to the second working fluid.

3. The system of claim 1, wherein the first working fluid comprises steam, and the second working fluid comprises an organic fluid, $H_2$, $CO_2$, or ammonia.

4. The system of claim 1, wherein the system comprises a boiler using high pressure oxy-fuel combustion.

5. The system of claim 1, wherein the system comprises a boiler using ambient pressure combustion.

6. The system of claim 1, wherein the exergy loss and residual energy produced by the first Rankine cycle system is recovered by the second system without discharging any of the residual energy to ambient using a condenser.

7. The system of claim 1, wherein the residual energy from the boiler flue gas superheats the first stream of the second working fluid.

* * * * *